United States Patent Office 3,075,573
Patented Jan. 29, 1963

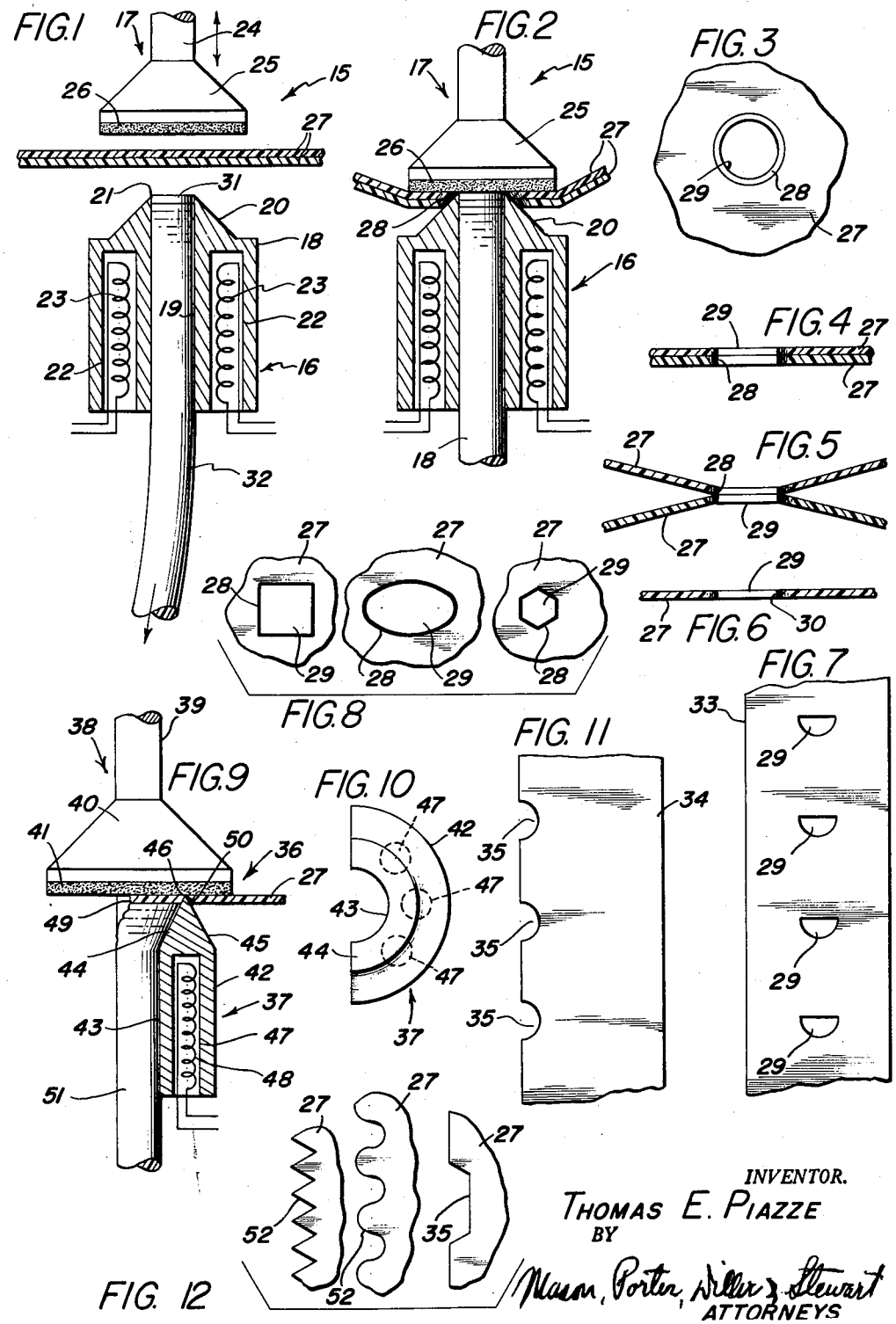

3,075,573
APPARATUS FOR PUNCHING HOLES OR CUT-OUTS IN THERMOPLASTIC SHEET MATERIAL
Thomas E. Piazze, Mount Vernon, Ohio, assignor to Continental Can Company, Inc., New York, N.Y., a corporation of New York
Filed Sept. 23, 1959, Ser. No. 841,837
6 Claims. (Cl. 156—513)

This invention relates in general to new and useful improvements in the art of punching holes or cut-outs in thermoplastic sheet materials, and more specifically relates to a novel method of punching holes or cut-outs in thermoplastic sheet material, which method incorporates the heat treating of the thermoplastic sheet material about the periphery of the cut-out and the collecting of the cut-out waste material.

In the punching of holes and cut-outs in sheet material, the collection of the waste material presents a problem. This is particularly true when the cut-outs are formed in the edge of the sheet material.

It is therefore an object of the invention to provide a novel method of punching holes or cut-outs in thermoplastic sheet material wherein the cut-out waste material is heated within the die used in the punching operation, and the waste material bonds together to form a continuous rod of the thermoplastic material, which rod may be readily removed from the die and collected, thereby avoiding the normal problem of collecting individual small pieces of waste material.

Another object of the invention is to provide a heated die for use in punching holes and cut-outs in thermoplastic sheet materials, the die being heated and having a heated shoulder which is engaged by the portion of the thermoplastic material about the periphery of the cut-out immediately subsequent to the punching operation to heat treat the thermoplastic material and form a bead about the cut-out.

Still another object of the invention is to provide a novel die for use in the punching of holes or cut-outs in one or more sheets of thermoplastic material, the die having an upper cutting edge, a shoulder adjacent the cutting edge, and a recess aligned with the cutting edge, the recess being intended to receive the waste material, the heating of the die resulting in the heat treatment of the thermoplastic material about the periphery of the cut-out, and the bonding together of the waste material into a continuous thermoplastic rod.

A further object of the invention is to punch holes or cut-outs in one or more sheets of thermoplastic material with a hot die so that when the holes are punched in two or more sheets of the thermoplastic material at a given time by the hot die, the edges of the holes will be fused together by the heat of the die, thus forming in a single operation the desired holes in the sheets of plastic material and bonding and sealing together the sheets about the periphery of the holes.

A still further object of the invention is to provide a novel method of punching holes and cut-outs in thermoplastic material, the method utilizing a heated die having a chip receiving recess, the walls of which are heated sufficiently to melt the chips of thermoplastic material so that the waste material is integrated into an elongated rod, thereby eliminating the existence of loose chips of waste material and providing waste material which may be readily handled.

With the above, and other objects in view that will hereinafter appear, the nature of the invention will be more clearly understood by reference to the following detailed description, the appended claims, and the several views illustrated in the accompanying drawing.

In the drawing:
FIGURE 1 is a schematic elevational view, showing the relationship of the components of the punch and thermoplastic sheet material immediately prior to a punching operation to form cut-outs in the thermoplastic sheet material, the die of the punch being shown in section with the rod of integrated waste material depending therefrom.

FIGURE 2 is an elevational view similar to FIGURE 1, and shows the punch in position immediately subsequent to a punching operation.

FIGURE 3 is a fragmentary plan view of the sheet material after the hole has been punched therein and the material sealed about the hole.

FIGURE 4 is a fragmentary vertical sectional view taken through the hole in the sheet material, and shows the manner in which the individual sheets are bonded together about the hole.

FIGURE 5 is a vertical sectional view similar to FIGURE 4, and shows the sheet material expanded and further, the details of the sealing of the sheet material together around the hole.

FIGURE 6 is a fragmentary vertical sectional view taken through a single sheet of thermoplastic material after a hole has been formed therein and the material heat treated about the periphery of the hole.

FIGURE 7 is a plan view showing a web of thermoplastic material as it would appear after a series of cut-outs has been formed therein.

FIGURE 8 shows several additional sheets having other shapes of cut-outs formed therein.

FIGURE 9 is an elevational view similar to FIGURE 2, and shows the details of a punch for forming cut-outs in an edge portion of a sheet, the die being shown in section.

FIGURE 10 is a plan view of the die and shows the general configuration thereof and the arrangement of individual electric heaters therein.

FIGURE 11 is a plan view of a web having cut-outs formed in an edge thereof with the punch of FIGURE 9.

FIGURE 12 shows additional sheets and variations of cut-outs which may be formed in the edges thereof.

An embodiment of punch particularly intended for forming holes or cut-outs in sheet material spaced from the edges thereof is best illustrated in FIGURES 1 and 2, the punch being generally referred to by the numeral 15. The punch 15 includes a die, generally referred to by the numeral 16, and a plunger unit, generally referred to by the numeral 17. The die 16 will preferably be fixed, and the plunger unit 17 vertically reciprocated, as indicated by the arrows in FIGURE 1. However, it is feasible to hold the plunger assembly 17 stationary and to vertically reciprocate the die 16.

The die 16 includes a generally cylindrical body 18 having a waste material receiving recess 19 therethrough, the recess 19 being in the form of a central bore having a cross-section identical with the cross-section of the hole or cut-out to be formed in the sheet material. The upper end of the body 18 is in the form of an upwardly tapering shoulder 20 which intersects the upper end of the recess 19 to define a cutting edge 21.

The body 18 is provided with a plurality of circumferentially spaced bores 22 which are disposed equidistant about the recess 19. An electric heater 23 is positioned in each of the bores 22, the bores 22 opening through the bottom of the body 18 to facilitate the insertion of the electric heaters 23. It is to be noted that the electric heaters 23 are disposed adjacent to the wall of the recess 19 and to the shoulder 20 so that the two may be heated to the desired temperature. Suitable controls, not shown, may be provided for the electric heaters 23 to maintain the portions of the die 16 at the desired temperature.

The plunger assembly 17 includes a vertically reciprocable shaft 24 which has an enlarged head 25 secured to the lower end thereof. A resilient pad 26 is secured to the underside of the head 25 for cooperation with the die 16. It is preferable that the pad 26 be formed of "Teflon," although other materials may suffice.

A pair of sheets 27 of thermoplastic material are illustrated in position between the punch assembly 17 and the die 16 for having holes or cut-outs formed therein. With the sheets 27 so positioned, the punch assembly 17 is moved downwardly to the position illustrated in FIGURE 2, in which position the sheets 27 are forced into engagement with the die 16 and the desired opening or cut-out is formed therein by the cutting edge 21. As the material of the sheets 27 is cut by the cutting edge 21, the sheets 27 pass down around the cutting edge and into engagement with the shoulder 20. The shoulder 20 being heated to a temperature sufficient to melt the thermoplastic material from which the sheets 27 are formed, the material of the sheets 27 surrounding the holes or cut-outs formed therein is melted and bonded together to form what may be considered a bead 28. The bead extends about the periphery of the hole or cut-out, which is referred to by the numeral 29.

Reference is now made to FIGURES 3, 4 and 5, wherein a typical cut-out and bead arrangement is illustrated. The cut-out 29 is circular in outline, although it may be of other configurations, as will be described hereinafter. The bead 28 extends the full thicknesses of the two sheets 27 and serves not only to reinforce the material of the sheets 27 around the periphery of the cut-out 29, but also serves to bond together the two sheets 27 around the cut-out 29 and thus seal the two sheets 27 together. This is best illustrated in FIGURE 5. Assuming the sheets 27 to be walls of a package, the cut-out 29 may receive a hanger to facilitate the supporting of the package. The bead 28 not only reinforces the material of the sheet 27 to prevent tearing by the hanger, but also retains the package in its sealed state.

Although the punch 15 is primarily intended for punching holes and cut-outs in multiple thicknesses of sheets, it may also be utilized for forming a cut-out 29 in a single sheet 27, as is illustrated in FIGURE 6. The cut-out 29 will be reinforced by a bead 30 which extends about the periphery of the cut-out 29, the bead 30 being formed by the melting of the material of the sheet 27 in engaging the shoulder 20 during the hole punching operation.

During a normal hole or cut-out forming operation, the waste material or chips enter into the recess in the die, for example the recess 19, and are forced out of the lower end thereof. A suitable tray may be provided for collecting the waste material, if desired. However, this does not eliminate the problem of numerous small pieces of waste material which may possibly be reclaimed. As in the case of a conventional die, the individual chips of waste material, which are referred to by the numeral 31, are deposited in the upper part of the recess 19 immediately upon being removed from the respective sheet in a punching operation. However, contrary to the usual procedure wherein the individual chips move through the die as individual parts, even though they may be loosely interlocked due to their cup shape, the individual chips 31 passing through the recess 19 lose their identity and are integrated into an elongated rod 32 of waste material. This is accomplished by heating the walls of the recess 19, utilizing the electric heaters 23, to a temperature which will bring about the melting of the waste material and the bonding and integration of the individual chips 31. In this manner, the waste material from punching operations is automatically collected into an elongated rod of waste material, the rod 32, which rod may be readily broken off and handled, and if economically feasible, salvaged. This will, of course, eliminate the problem of collecting the numerous individual chips 31 of waste material, which will result during a continuous punching operation.

As is best illustrated in FIGURE 8, the outline of the holes or cut-outs may vary, depending upon the particular requirements. Several outlines of cut-outs 29, in addition to the circular outline illustrated in FIGURE 3, are illustrated. These are only a few of the many outlines which may be assumed by the cut-outs 29.

Although the invention has been broadly described in conjunction with one or more sheets 27, normally the material to be operated on will be fed to the punch 15 in the form of an elongated web, which is best illustrated in FIGURE 7, the web being referred to by the numeral 33. Suitable means (not shown) will be provided for feeding the web 33 through the punch 15 in timed relation to the operation of the punch 15 so that the holes or cut-outs 29 will be formed in the web 33 at spaced intervals. The spacing and arrangement of the cut-outs 29 will vary depending upon the particular requirements.

In FIGURE 11, an elongated web 34 is illustrated. The web 34 differs from the web 33 in that cut-outs 35 are formed in the edge of the web 34 as opposed to the formation of the cut-outs 29 in the web 33 remote from the edges thereof. Although the cut-outs 35 could be formed with the punch 15, a special punch, generally referred to by the numeral 36, is provided for the purpose of forming cutouts in the edges of sheets.

The punch 36, as is best illustrated in FIGURE 9, includes a die, generally referred to by the numeral 37, and a punch assembly, generally referred to by the numeral 38. The punch assembly 38 is identical with the punch assembly 17, and includes a shaft 39 which is mounted for vertical reciprocation. The shaft 39 terminates at its lower end in a head 40 which has secured to the underside thereof a resilient pad 41, the pad being preferably formed of material, such as "Teflon."

The die 37 includes a generally semi-circular body 42 which is vertically disposed, and which will be suitably mounted in a fixed position. The body 42 is provided with an elongated recess 43 in one wall thereof. The recess 43 extends the full height of the body 42 and the upper portion thereof is outwardly flared, as at 44. The upper end of the body 42 is inwardly tapered to define a shoulder 45. The tapered shoulder 45 intersects the outwardly flared upper portion 44 to define a cutting edge 46.

The body 42 is provided with a plurality of vertical bores 47 which open through the lower end of the body 42 and which are spaced circumferentially about the recess 43. An electric heater 48 is disposed in each of the bores 47. The electric heaters 48 will be suitably controlled by control means, not shown, so as to maintain the walls of the recess 43 at a sufficiently high temperature to melt the waste material as it is deposited in the upper portion of the recess 43. Also, the heaters 48 will retain the shoulder 45 at a sufficient temperature to melt the thermoplastic material engaged therewith during the punching operation.

In the operation of the punch 36, one or more sheets 27 will be passed between the plunger assembly 38 and the die 37. When the sheet 27 is in the desired position, the plunger assembly 38 is moved downwardly, with the result that the resilient pad 41 will engage the upper surface of the sheet 27 and move it into engagement with the cutting edge 46 where it is cut to define the desired cut-out 35. The chip of waste material, the chip being referred to by the numeral 49, formed in the cutting operation will move down into the recess 43 and will initially be seated in the flared upper portion 44 thereof. At the same time, the periphery of the cut-out 35 being formed will be sufficiently heated by contact with the shoulder 45 to form a bead 50. Thus, the periphery of the cut-out 35 will be heat treated and reinforced by the melting of the material defining the cut-out 35.

As the chips 49 of waste material move into the flared upper portion 44 of the recess 43, they will be sufficiently heated so as to melt and to flow downwardly into the narrow cross-sectional lower portion of the recess 43 and combine with previously formed chips to form an integral rod 51 of the waste material.

Although individual sheets 27 may be fed into the punch 36, the sheets will be preferably in the form of a continuous web, such as the web 34 of FIGURE 11. Also, the die 37 may have any desired configuration, so that it may form individual cut-outs disposed in spaced relation, as shown in the example of FIGURE 11 and one example of FIGURE 12, or the cut-outs may be of a continuous nature to form scalloped edges 52 on the sheets 27, as shown in the two examples of FIGURE 12.

From the foregoing, it will be seen that novel and advantageous provision has been made for carrying out the desired end. However, attention is again directed to the fact that variations may be made in the example method and apparatus disclosed herein without departing from the spirit and scope of the invention, as defined in the appended claims.

I claim:

1. An apparatus for forming cut-outs in thermoplastic material and integrating the removed waste material into a readily handleable elongated member, said apparatus comprising a die having a continuous waste receiving opening with open opposite ends, said die having a cutting edge immediately surrounding one end of said waste receiving opening, a presser member opposing said die cutting edge and cooperating with said die to force thermoplastic material to be cut by said die into engagement with said cutting edge and for simultaneously pushing the resultant waste material into said opening, and heating means cooperating with said die for heating that portion of said die defining said waste receiving opening and bonding together the individual pieces of waste material into an elongated integrated member as the die is used and the waste material moves through said die.

2. A die for simultaneously forming a cut-out in thermoplastic material, heat treating the periphery of the cut-out, and bonding the cut-out waste material into a rod, said die comprising a body having a vertical material receiving recess extending the full height thereof, said body having a tapered upper portion defining a material engaging shoulder terminating in an upper cutting edge extending about the upper end of said recess, and heater means within said body for heating the wall of said recess and said shoulder.

3. The die of claim 2 wherein said die is particularly adapted for forming cut-outs spaced from the edge of said material and said recess is in the form of an opening extending entirely through and being surrounded by said body, and said shoulder and said cutting edge extend continuously about said opening.

4. The die of claim 2 wherein said die is particularly adapted for forming cut-outs in the edges of material and said recess is formed in one wall of said body, and said cutting edge has remote ends.

5. The die of claim 4 wherein said recess has an upwardly flared upper portion to facilitate the leading away of the waste material from said cutting edge.

6. The die of claim 2 wherein said heating means are in the form of a plurality of individual electric heaters spaced about said recess and below said shoulder.

References Cited in the file of this patent

UNITED STATES PATENTS

| | | |
|---|---|---|
| 2,122,368 | Engler | June 28, 1938 |
| 2,258,070 | Sawle | Oct. 7, 1941 |
| 2,259,239 | Brown | Oct. 14, 1941 |
| 2,604,167 | Oliver | July 22, 1952 |
| 2,618,311 | Parker | Nov. 18, 1952 |
| 2,679,194 | Ehrenfried | May 25, 1954 |